United States Patent
von Kaenel

(10) Patent No.: US 6,597,211 B2
(45) Date of Patent: Jul. 22, 2003

(54) CLOCK DIVIDER CIRCUIT PRODUCING 0° AND 90° OUTPUTS WITH A 50% DUTY CYCLE

(75) Inventor: Vincent R. von Kaenel, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/877,270

(22) Filed: Jun. 8, 2001

(65) Prior Publication Data

US 2002/0186061 A1 Dec. 12, 2002

(51) Int. Cl.[7] .............................................. H03K 23/44
(52) U.S. Cl. ....................... 327/115; 327/113; 327/254; 377/110; 377/105
(58) Field of Search ................................ 327/115, 257, 327/258, 254, 255, 231, 238; 377/121, 110, 105

(56) References Cited

U.S. PATENT DOCUMENTS

| | | | |
|---|---|---|---|
| 4,574,385 A | | 3/1986 | Huffman et al. ............ 377/107 |
| 4,951,303 A | * | 8/1990 | Larson ....................... 377/110 |
| 5,111,489 A | * | 5/1992 | Tanaka et al. ................ 377/12 |
| 5,249,214 A | | 9/1993 | Ulmer et al. ................ 377/121 |
| 5,479,125 A | * | 12/1995 | Tran ............................ 327/11 |
| 5,617,458 A | | 4/1997 | Jones et al. ................... 377/49 |
| 6,194,950 B1 | * | 2/2001 | Kibar et al. ................. 327/407 |

FOREIGN PATENT DOCUMENTS

DE 2423810 * 5/1974

OTHER PUBLICATIONS

SiByte, "Target Applications," http://sibyte.com/mercurian/applications.htm, Jan. 15, 2001, 2 pages.
SiByte, "SiByte Technology," http://sibyte.com/mercurian/technology.htm, Jan. 15, 2001, 3 pages.
SiByte, "The Mercurian Processor," http://sibyte.com/mercurian, Jan. 15, 2001, 2 pages.
SiByte, "Fact Sheet," SB–1 CPU, Oct. 2000, rev. 0.1, 1 page.
SiByte, "Fact Sheet," SB–1250, Oct. 2000, rev. 0.2, 10 pages.
Stepanian, SiByte, SiByte SB–1 MIPS64 CPU Core, Embedded Processor Forum 2000, Jun. 13, 2000, 15 pages.
Jim Keller, "The Mercurian Processor: A High Performance, Power–Efficient CMP for Networking," Oct. 10, 2000, 22 pages.
Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.

* cited by examiner

*Primary Examiner*—Dinh T. Le
(74) *Attorney, Agent, or Firm*—Lawrence J. Merkel; Meyertons, Hood, Kivlin, Kowert & Goetzel, P.C.

(57) ABSTRACT

A clock divider circuit producing 0° and 90° outputs with a 50% duty cycle is provided. In one embodiment, the clock divider circuit may include a pair of cross-coupled circuits. The clock divider circuit may produce a first output clock signal and a second output clock signal that is phase shifted a positive 90° with respect to the first output clock signal. The operation of the circuit may be responsive only to the input clock signal. In other words, the circuit may not require a reset signal to operate in a deterministic fashion.

18 Claims, 5 Drawing Sheets

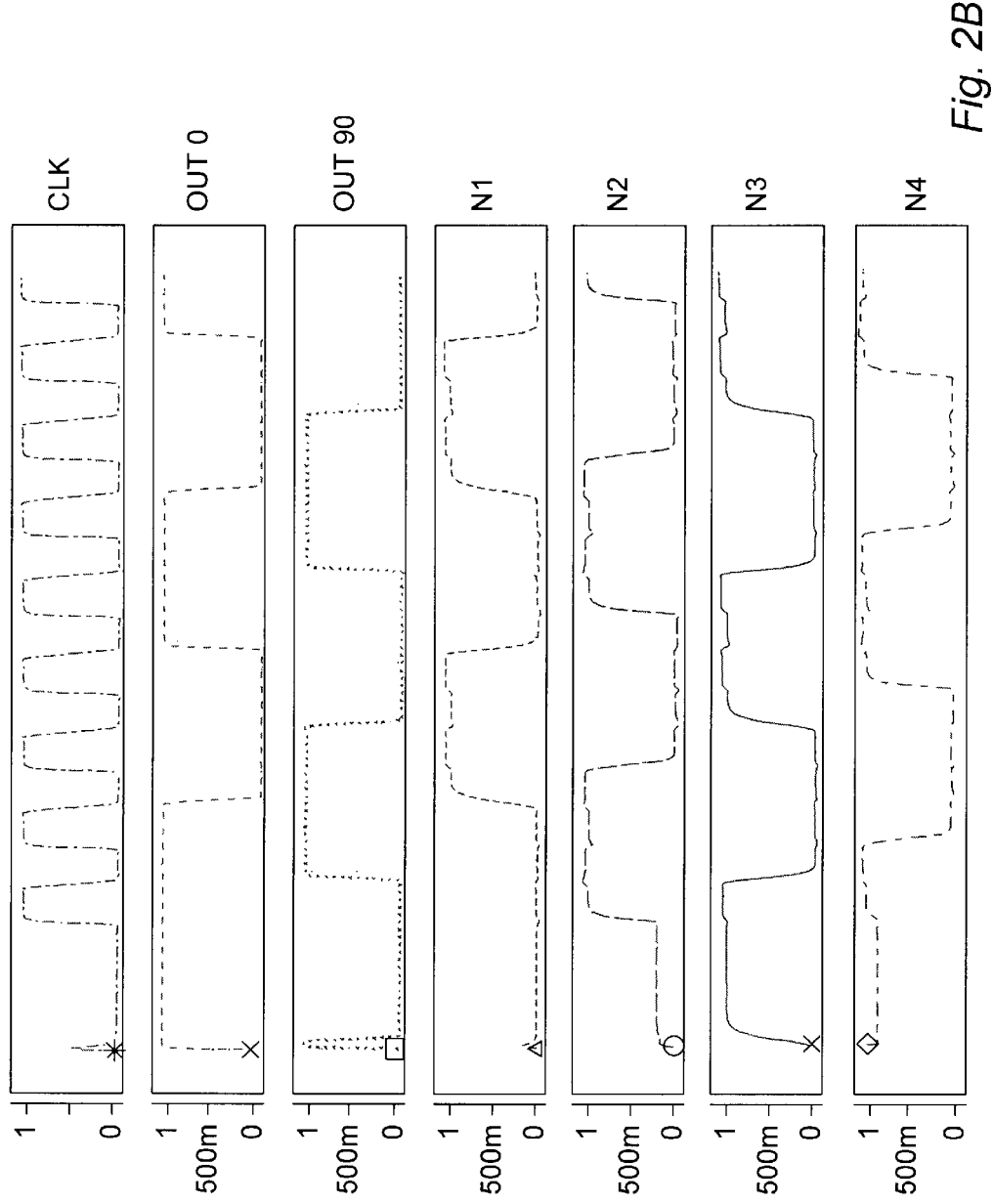

CLOCK DIVIDER CIRCUIT PRODUCING 0° AND 90° OUTPUTS WITH A 50% DUTY CYCLE

BACKGROUND OF THE INVENTION

1. Field of the Invention

This invention relates to electronic circuits, and more particularly, clock divider circuits.

2. Description of the Related Art

Many computer systems use multiple clock signals having different periods. For example, it is not uncommon for the motherboard of a personal computer system to have a first clock signal of a first frequency, while a processor mounted on the motherboard operates at a second, higher clock frequency.

Production of the different clock signals may be accomplished in various ways. In some cases, separate crystal oscillators may be used to produce the different clock signals. In other cases, it may be desirable use a signal crystal oscillator, or other clock source, along with clock divider and/or multiplier circuitry. For example, if implementing a divide by four circuit, a typical approach may include the use of a first divide by two circuit as an input stage to generate a clock (clk) and a complementary signal, clock bar (!clk). The divide by two circuits may be implemented using D-type flip-flops. The clk and !clk signals from the input stage may then be forwarded to separate divide by two circuits. The outputs of the separate divide by two circuits may be phase shifted by 90° from each other, which may be useful for producing additional clock signals.

With many circuits, it may be difficult to ensure an accurate 90° phase shift between the signals (i.e. that one predetermined signals has a positive 90° phase shift with respect to the other signal). For the circuits mentioned above, a reset or other control signal is normally used to initialize the circuit to a state which provides a predetermined phase shift of one signal from the other.

SUMMARY OF THE INVENTION

A clock divider circuit is provided. In one embodiment, the clock divider circuit may include a set of clocked circuits coupled to receive an input clock signal and a complement of the input clock signal. The clocked circuits may produce a first output clock signal and a second output clock signal that is phase shifted approximately a positive 90° with respect to the first output clock signal. The clock divider circuit may be responsive only to the input clock signal. In other words, the clock divider circuit may not require a reset signal or other type of control signal in order to provide a predictable positive 90° phase shift. The clock signals may also have approximately a 50% duty cycle. In one embodiment, the clock divider circuit may include a series coupled set of input circuits coupled to receive a clock signal and configured to generate the input clock signal and its complement.

In one embodiment, the clock divider circuit may include a pair of cross-coupled divide by two circuits. The divide by two circuits may include a plurality of clocked circuits which are configured to pass an input to an output on one phase of the clock cycle, and isolate the output from the input on another phase of the clock cycle. The clocked circuits may be passgates. The clocked circuits may be transparent during different phases of the clock cycle. For example, in one embodiment, a divide-by-4 circuit may include four passgates, two of which may be transparent during a clock phase opposite of that for which the other two passgates are transparent. This may result in a pair of output clock signals, wherein a designated one of the output clock signals has approximately a positive 90° phase shift with respect to the other clock signal. The output clock signals may also have duty cycle which closely approximates 50% (e.g. about 0.1% error may be experienced in one implementation).

BRIEF DESCRIPTION OF THE DRAWINGS

Other aspects of the invention will become apparent upon reading the following detailed description and upon reference to the accompanying drawings in which:

FIG. 2B is another timing diagram illustrating timing relationships for one embodiment of the clock divider circuit;

Figure 1:
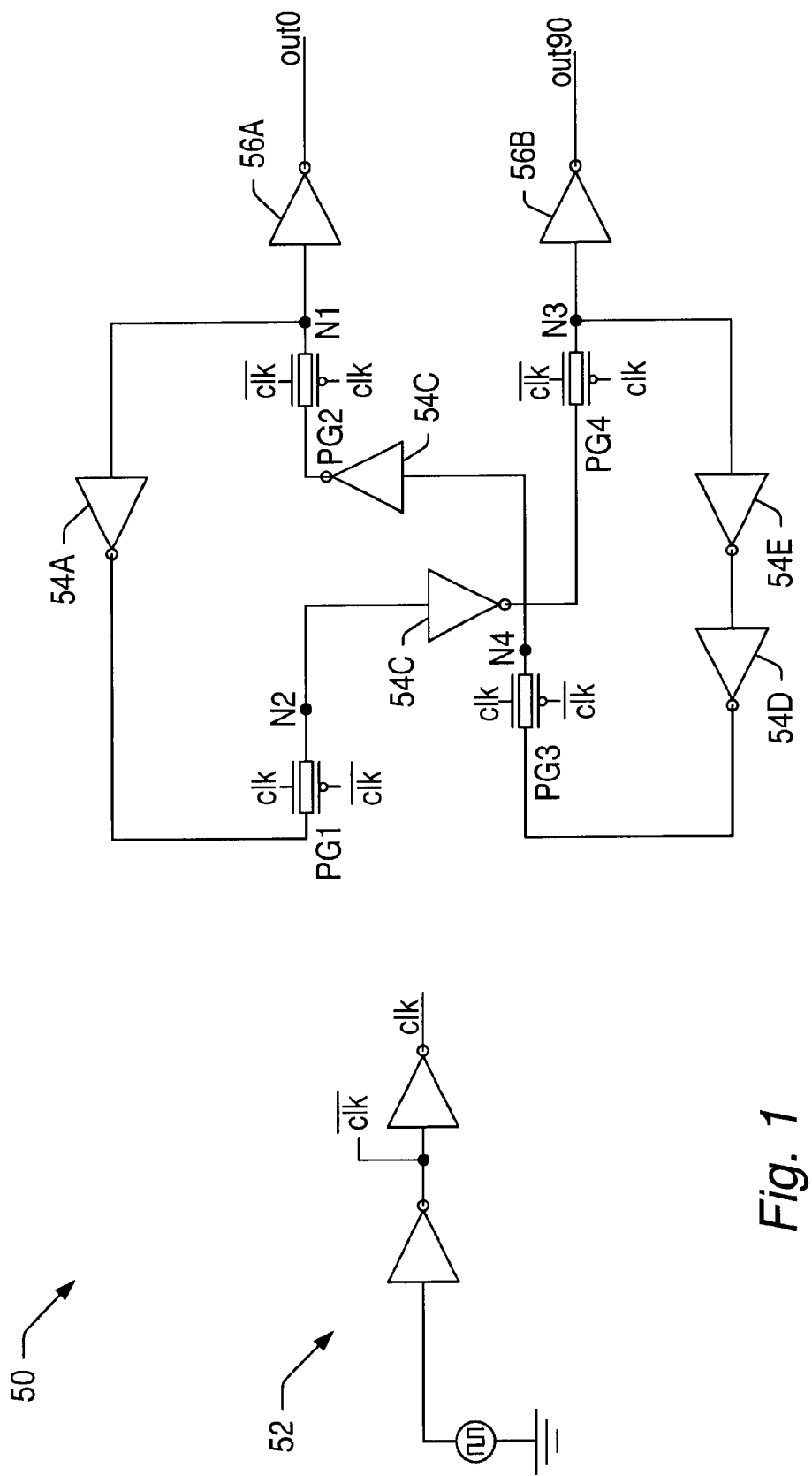
FIG. 1 is a schematic diagram of one embodiment of the clock divider circuit.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE PREFERRED EMBODIMENTS

Turning now to FIG. 1, a schematic diagram of one embodiment of a clock divider circuit 50 is shown. Other embodiments of the clock divider circuit are possible and contemplated.

In the embodiment shown, clock divider circuit 50 is a divide by four circuit. Clock divider circuit 50 includes an input circuit 52, a plurality of inverters 54A–54E, and a plurality of clocked circuits (PG1, PG2, PG3, and PG4). Input circuit 52 includes a pair of series-coupled inverters, and is configured to produce a clock signal, clk, and a complementary clock signal, $\overline{\text{clk}}$. It is noted that the clock signal and complementary clock signal may be generated in any fashion, as desired.

The clock signal and its complement may be coupled to clocked circuits PG1–PG4. In the embodiment shown, the clocked circuits PG1–PG4 include passgates. However, any clocked circuits which are transparent during one phase of the clock and isolate the input from the output during another phase of the clock may be used (e.g. latches). As previously noted, the clock divider circuit 50 includes a plurality of inverters 54A–54E. More particularly, an odd number of inverters 54A–54E may be included in the ring formed by the connections between the passgates. Using an odd number of inverters may cause the circuit to oscillate. Additionally, use of the clocked circuits PG1–PG4 clocked by the input clock signal may cause the oscillation to occur at a frequency determined by the input clock signal.

Passgates PG1 and PG3 are turned on when the signal clk is asserted, and are transparent at this time (i.e. the input of the passgate is allowed to pass to the output). During this phase of the *clk* signal, passgates PG3 and PG4 are off, and are thus isolate their inputs from their respective outputs (i.e. the input to the passgate is not allowed to pass to the output). When the *clk* signal is de-asserted, passgates PG3 and PG4 are turned on, and thus transparent, while passgates PG1 and PG2 are turned off, and thus non-transparent.

An inverter 54A is coupled between the output of passgate PG2 (node N1) and the input to passgate PG1. Similarly, an inverter 54B is coupled between the output of passgate PG3 (node N4) and the input to passgate PG2; an inverter 54C is coupled between the output of passgate PG1 (node N2) and the input of passgate PG4; and a pair of series coupled inverters 54D–54E are coupled between the output of passgate PG4 (node N3) and the input to passgate PG3. In the circuit arrangement shown, the relationships between each of the nodes may be expressed as follows: N2=!N1, N3=!N2, N4=N3, and N1=!N4 (where the symbol "!" refers t logical inversion). It is important to note that these relationships are delayed by one half of an input clock cycle (e.g. the state of N2 becomes equal to the state of !N1 one half clock cycle following the change of !N1 to its most current state). In addition, equations for the output signals may be expressed as follows: out0=!N1 and out90=!N3. The relationships expressed in these equations do not expressly include the half-clock cycle delay, although there may be propagation delay through the inverters 56A–56B shown in this particular embodiment. Other embodiments that do not include the inverters 56A–56B to drive the output clock signals are possible and contemplated (with out0=N1 and out90=N3).

As mentioned above, the embodiment of the clock divider circuit 50 illustrated in FIG. 1 is a divide by four circuit. In other words, the output clock signals (out0 and out90) produced by this embodiment of clock divider circuit have a frequency that is one fourth of the frequency of the input clock. The propagation of a single transition through the loop occurs over two input clock cycles. For example, a transition (logic 0 to logic 1 or logic 1 to logic 0) at node N1 propagates (inverted) to node N2 during the high phase of a first clock cycle, then from node N2 to N3 (inverted) during the low phase of the first clock cycle, then from node N3 to N4 in the high phase of a second clock cycle, and finally from node N4 to N1 (inverted) during the low phase of the second clock cycle. Thus, two transitions of the output clocks out0 and out90 occur over a total of four input clock cycles. Since there is an odd number of inverters in the loop, a transition propagates through the loop and arrives back at its initial node as a transition in the opposite direction, and thus the circuit oscillates. With the arrangement of circuits PG1–PG4 clocked by the input clock signal, the oscillation occurs at a quarter of the input clock frequency.

The configuration of the circuit may allow the first output clock signal (out0) to lead the second output clock signal (out90) by approximately 90° (where a small amount of error may occur due to device mismatch), regardless of the initial conditions of the circuit at start-up. Particularly, a transition on node N1 (which is reflected on out0 through output inverter 56A) propagates to the same transition on node N3 one clock cycle of the input clock signal later (i.e. a transition on N1 occurs during the low phase of a clock cycle of the input clock, is inverted and propagated to node N2 during the following high clock phase of the input clock signal, and then is inverted again and propagated to node N3 during the following low phase of the input clock signal). Thus, the clock signal out90 lags the clock signal out0 by one clock cycle of the input clock signal. Since the clock divider circuit 50 is a divide by four circuit, the one clock cycle of the input clock signal is one fourth of the output clock cycle, which is 90° of positive phase shift from out0 to out90.

While the illustrated embodiment is a divide by four circuit, other embodiments may divide by other amounts. For example, a divide by eight circuit is contemplated which includes eight passgates coupled in a ring, with an inverter coupled between successive passgates in the ring (and one link between passgates having two series coupled inverters to provide an odd number of inverters in the ring). The divide by eight circuit may produce a 90° phase shift by coupling the out90 output to a node four passgates downstream from the output out0 (i.e. the node to which the out90 output is coupled may receive a transition which occurs on the node to which the out0 output is coupled two clock cycles of the input clock signal, which is one quarter of the output clock cycles of the divide by eight circuit).

It is noted that the phase shift generated by various embodiments of the clock divider circuit 50 may be varied by changing the node from which the output clock signals are taken. Since transitions flow from node to node responsive to phases of the input clock signal, the phase shift generated may be predetermined based on the number of clock phases which occur between the selected nodes and the number of inversions which occur between the two nodes. The predetermined phase shift may be generated independent of the initial condition of the circuit when powered up, and thus no reset or other control signals may be required to generate the desired phase shift.

The clock divider circuit 50 may be viewed as a pair of cross-coupled divide by two circuits. For example, the passgates PG1 and PG4 and the inverter 54C may be a first divide by two circuit (if the output of the passgate PG4 were coupled to the input of the passgate PG1). Similarly, the passgates PG3 and PG2 and the inverter 54B may be a divide by two circuit (if the output of the passgate PG2 were coupled to the input of the passgate PG3). To cross-couple the divide by two circuits, the output of the first divide by two circuit is coupled as the input to the second divide by two circuit and the output of the second divide by two circuit is coupled as the input of the first divide by two circuit. Specifically, the output of the first divide by two circuit (node N3) is coupled to the input of the second divide by two circuit through a pair of inverters 54D–54E and the output of the second divide by two circuit (node N1) is coupled to the input of the first divide by two circuit through an inverter 54A.

It should be noted the phase shift and the duty cycle may not be exactly 50% and 90°. For example, process variations may lead to mismatches in the propagation delay through the inverter 56A which drives out0 with respect the inverter 56B that drives out90, and thus the phase shift may be slightly greater or less than 90°. Similarly, other process variations in the various circuit elements may cause the duty cycle to be slightly greater or less than 50%. Through careful layout and circuit matching techniques, it may be possible to reduce the mismatch (and thus the error) to a minimal value.

Figure 2A:
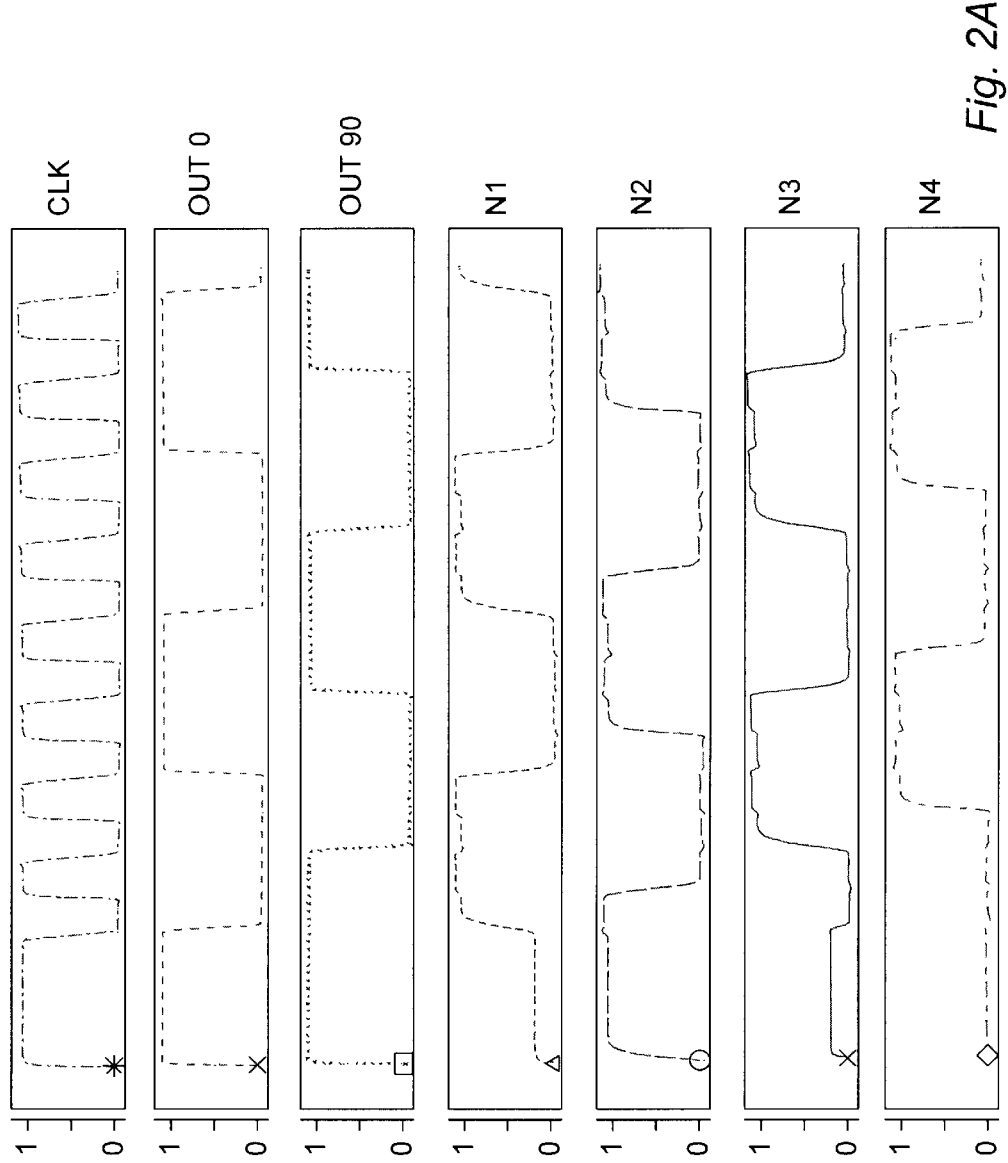
FIG. 2A is a timing diagram illustrating timing relationships for one embodiment of the clock divider circuit.
Figure 2C:
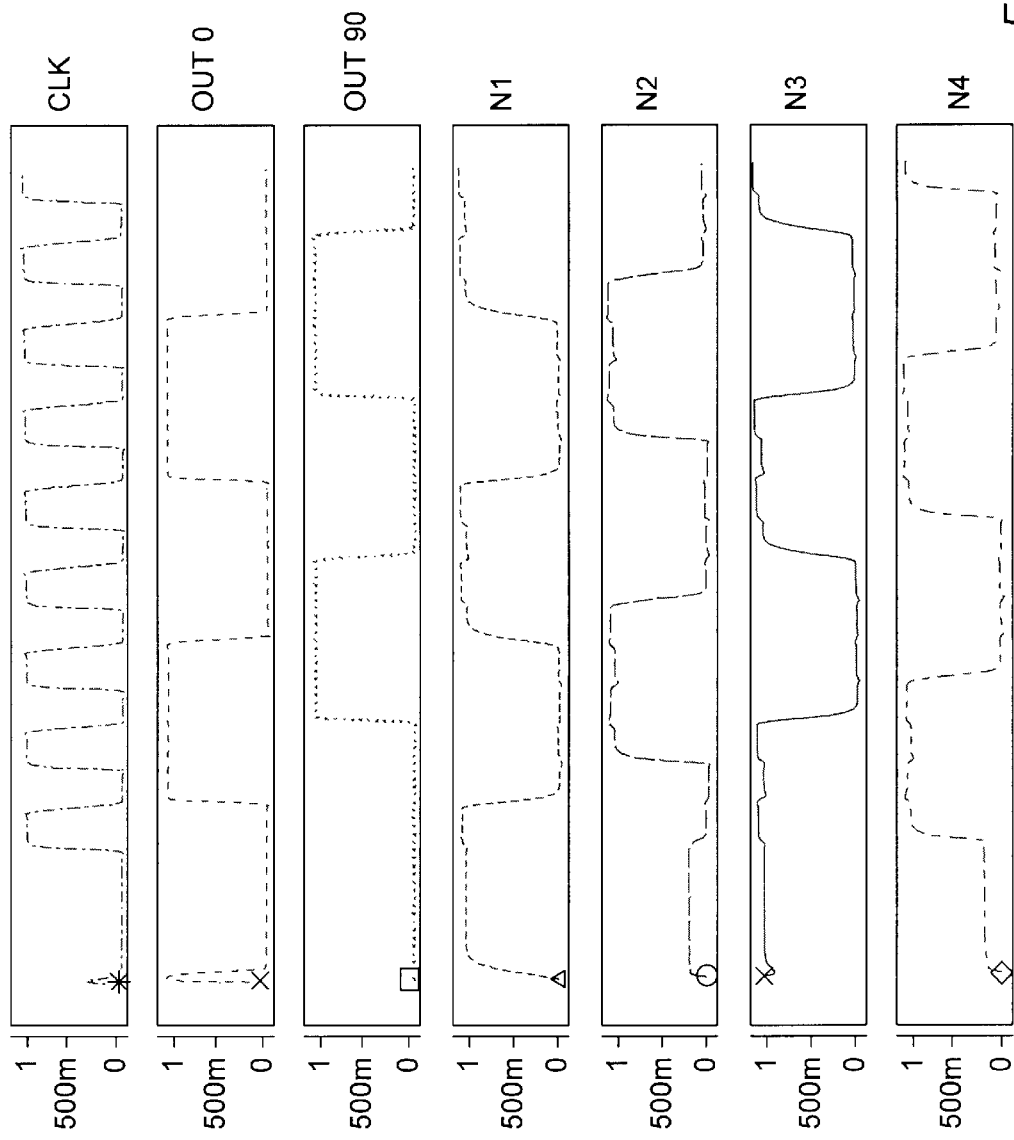
FIG. 2C is another timing diagram illustrating timing relationships for one embodiment of the clock divider circuit.

FIGS. 2A, 2B, and 2C are timing diagrams illustrating the timing relationships between the various circuit nodes for the embodiment of clock divider circuit 50 illustrated in FIG. 1. The results shown were obtained from simulation of the circuit using circuit simulation software. The initial conditions were varied for each of these simulation runs.

In FIG. 2A, the initial conditions include nodes N1–N4 all being a logic zero and the clock signal, clk, beginning at a logic 0 and transitioning to a logic 1. The clock signal then begins its normal transitions. Within a few transitions of the input clock signal, the nodes in the ring are oscillating at one quarter of the input clock frequency. FIG. 2B illustrates the operation of the circuit with a different set of initial conditions. The initial conditions for the circuit for this simulation run are N1 low, N2 low, N3 low, and N4 high, with clk initially held low. FIG. 2C shows the circuit exhibiting the same pattern of operation, despite yet another set of initial conditions (N1 low, N2 low, N3 high, N4 low). Thus, for each of the sets of initial conditions for the simulation results presented herein, the circuit exhibits the same timing relationships after the input clock signal begins its normal cycle and a short settling time. In general, simulation results for each set of initial conditions of the nodes N1–N4 and the input clock signal have shown that clock divider circuit 50 operates in a similar manner to that shown in FIGS. 2A, 2B, and 2C, regardless of the initial conditions.

Figure 3:
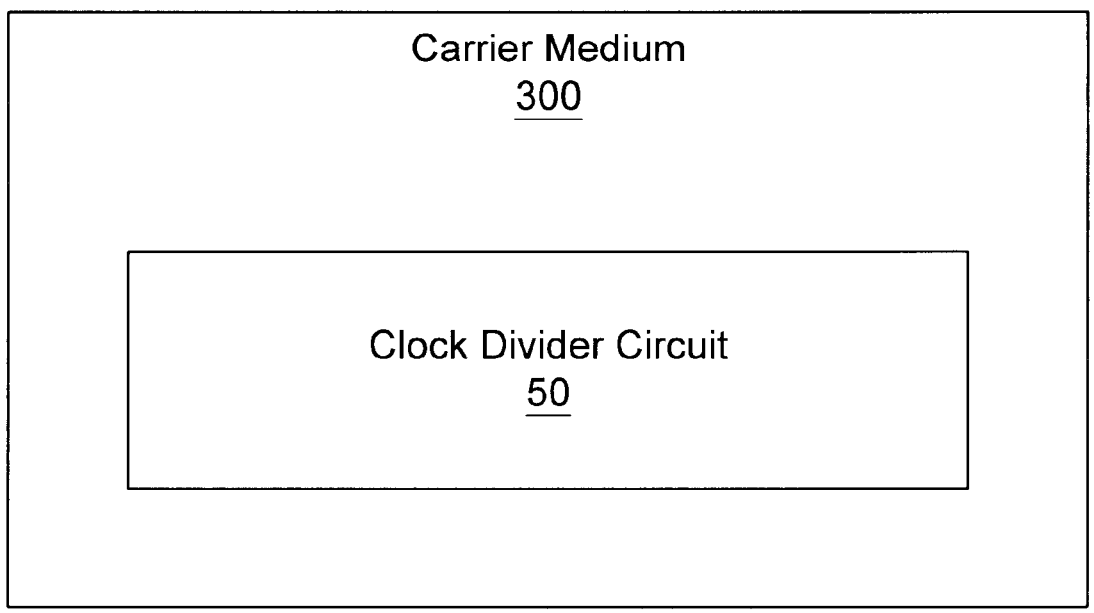
FIG. 3 is a block diagram of one embodiment of a carrier medium.

Turning next to FIG. 3, a block diagram of a carrier medium 300 including a database representative of clock divider circuit 50 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of clock divider circuit 50 carried on carrier medium 300 may be a database which can be read by a program and used, directly or indirectly, to fabricate the hardware comprising clock divider circuit 50. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising clock divider circuit 50. The netlist may then be placed and routed to produce a data set describing geometric shapes to be applied to masks. The masks may then be used in various semiconductor fabrication steps to produce a semiconductor circuit or circuits corresponding to clock divider circuit 50. Alternatively, the database on carrier medium 300 may be the netlist (with or without the synthesis library) or the data set, as desired.

While carrier medium 300 carries a representation of clock divider circuit 50, other embodiments may carry a representation of any portion of clock divider circuit 50, as desired.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A clock divider circuit comprising:
   a plurality of clocked circuits coupled to receive an input clock signal, wherein the plurality of clocked circuits are coupled in a ring, wherein at least one inverter is coupled between successive clocked circuits in the ring, and wherein the clock divider circuit includes an odd total number of the inverters in the ring;
   wherein the plurality of clocked circuits are configured to output a first clock signal and a second clock signal, responsive only to the input clock signal, and wherein the second clock signal has a predetermined phase shift with respect to the first clock signal, the predetermined phase shift being about a positive 90 degrees.

2. The clock divider circuit as recited in claim 1, wherein each of the plurality of clocked circuits includes a passgate.

3. The clock divider circuit as recited in claim 2 wherein the passgates within successive clocked circuits are coupled to the input clock signal to be transparent during opposite phases of the input clock signal.

4. A clock divider circuit comprising:
   a pair of cross-coupled divide by two circuits, wherein an output of a first divide by two circuit is a first clock signal and the output of a second divide by two circuit is a second clock signal having about a positive ninety degree phase shift with respect to the first clock signal, wherein the clock divider is coupled to receive an input clock signal for generating the first clock signal and the second clock signal;
   wherein the clock divider circuit is responsive only to the input clock signal.

5. The clock divider circuit as recited in claim 4, wherein the output of the first divide by two circuit is coupled through an inverter to the input of the second divide by two circuit.

6. The clock divider circuit as recited in claim 5, wherein the output of the second divide by two circuit is coupled through a pair of series coupled inverters to the input of the second divide by two circuit.

7. A clock divider circuit comprising:
   a first clocked circuit coupled to receive an input clock signal and configured to be transparent during a first phase of the input clock signal;
   a second clocked circuit coupled to receive the input clock signal and configured to be transparent during a second phase of the input clock signal;
   a third clocked circuit coupled to receive the input clock signal and configured to be transparent during the first phase of the input clock signal;
   a fourth clocked circuit coupled to receive the input clock signal and configured to be transparent during the second phase of the input clock signal;
   a first inverter coupled between the first clocked circuit and the second clocked circuit;
   a second inverter coupled between the second clocked circuit and the third clocked circuit;
   a third inverter coupled between the third clocked circuit and the fourth clocked circuit; and
   a fourth inverter and a fifth inverter coupled in series between the fourth clocked circuit and the first clocked circuit;
   wherein the clock divider circuit is responsive only to the input clock signal;
   wherein the clock divider is configured to output a first clock signal and a second clock signal, wherein the second clock signal has a about a positive 90 degree phase shift with respect to the first clock signal.

8. The clock divider circuit as recited in claim 7 wherein each of the first clocked circuit, the second clocked circuit, the third clocked circuit, and the fourth clocked circuit includes a passgate.

9. The clock divider circuit as recited in claim 7 further comprising a sixth inverter coupled to the first clocked circuit and a seventh inverter coupled to the third clocked circuit, the output of the sixth inverter being a first clock output of the clock divider circuit and the output of the seventh inverter being a second clock output of the clock divider circuit.

10. A carrier medium comprising one or more databases representing:
- a plurality of clocked circuits coupled to receive an input clock signal, wherein the plurality of clocked circuits are coupled in a ring, wherein at least one inverter is coupled between successive clocked circuits in the ring, and wherein the clock divider circuit includes an odd total number of the inverters in the ring;
- wherein the plurality of clocked circuits are configured to output a first clock signal and a second clock signal, responsive only to the input clock signal, and wherein the second clock signal has a predetermined phase shift with respect to the first clock signal, wherein the predetermined phase shift is about a positive 90 degrees.

11. The carrier medium as recited in claim 10, wherein each of the plurality of clocked circuits includes a passgate.

12. The carrier medium as recited in claim 11, wherein the passgates within successive clocked circuits are coupled to the input clock signal to be transparent during opposite phases of the input clock signal.

13. A carrier medium comprising one or more databases representing:
- a clock divider including a pair of cross-coupled divide by two circuits, wherein an output of a first divide by two circuit is a first clock signal and the output of a second divide by two circuit is a second clock signal having about a positive ninety degree phase shift with respect to the first clock signal, wherein the clock divider is coupled to receive an input clock signal for generating the first clock signal and the second clock signal;
- wherein the clock divider is responsive only to the input clock signal.

14. The carrier medium as recited in claim 13, wherein the output of the first divide by two circuit is coupled through an inverter to the input of the second divide by two circuit.

15. The carrier medium as recited in claim 14, wherein the output of the second divide by two circuit is coupled through a pair of series coupled inverters to the input of the second divide by two circuit.

16. A carrier medium comprising one or more databases representing:
- a first clocked circuit coupled to receive an input clock signal and configured to be transparent during a first phase of the input clock signal;
- a second clocked circuit coupled to receive the input clock signal and configured to be transparent during a second phase of the input clock signal;
- a third clocked circuit coupled to receive the input clock signal and configured to be transparent during the first phase of the input clock signal;
- a fourth clocked circuit coupled to receive the input clock signal and configured to be transparent during the second phase of the input clock signal;
- a first inverter coupled between the first clocked circuit and the second clocked circuit;
- a second inverter coupled between the second clocked circuit and the third clocked circuit;
- a third inverter coupled between the third clocked circuit and the fourth clocked circuit; and
- a fourth inverter and a fifth inverter coupled in series between the fourth clocked circuit and the first clocked circuit;
- wherein the clock divider circuit is responsive only to the input clock signal;
- wherein the clock divider is configured to output a first clock signal and a second clock signal, wherein the second clock signal has a about a positive 90 degree phase shift with respect to the first clock signal.

17. The carrier medium as recited in claim 16, wherein each of the first clocked circuit, the second clocked circuit, the third clocked circuit, and the fourth clocked circuit includes a passgate.

18. The carrier medium as recited in claim 16, wherein the database further comprises a representation of a sixth inverter coupled to the first clocked circuit and a seventh inverter coupled to the third clocked circuit, the output of the sixth inverter being a first clock output of the clock divider circuit and the output of the seventh inverter being a second clock output of the clock divider circuit.

* * * * *